United States Patent [19]

Bleckmann et al.

[11] 4,358,164
[45] Nov. 9, 1982

[54] METHOD AND CIRCUIT FOR THE GENERATION OF A SPEED REFERENCE SIGNAL FOR AN ANTISKID SYSTEM

[75] Inventors: Hans W. Bleckmann, Frankfurt am Main, Fed. Rep. of Germany; Heinz Loreck, Moedling, Austria

[73] Assignee: ITT Industries, Inc., New York, N.Y.

[21] Appl. No.: 214,383

[22] Filed: Dec. 8, 1980

[30] Foreign Application Priority Data

Dec. 21, 1979 [DE] Fed. Rep. of Germany ....... 2951754

[51] Int. Cl.³ .............................................. G06F 15/20
[52] U.S. Cl. ...................................... 303/93; 364/426
[58] Field of Search ........................... 303/20, 91–93, 303/95–97, 100, 103; 364/426

[56] References Cited

U.S. PATENT DOCUMENTS 4,022,513  5/1977  Hirzel et al. ........................ 303/93
4,037,881  7/1977  Fleagle ............................... 303/106

Primary Examiner—B. Dobeck
Assistant Examiner—S. M. Bergmann
Attorney, Agent, or Firm—John T. O'Halloran; Alfred C. Hill

[57] ABSTRACT

It is known that a vehicle speed reference signal suitable for slip control can be obtained by fully releasing the braking force at one or more vehicle wheels intermittently and to obtain the true vehicle speed from the signal provided by the free-rotating wheels. However, this technique results in the stopping distance of the vehicle being longer than desired since the braking effectiveness is considerably reduced. To avoid this disadvantage, the present invention compares a speed reference signal cyclically with the instantaneous velocity signals of the wheels and to weight the comparison result dependent on whether the instantaneous velocity signal comes from a driven wheel or a non-driven wheel. The weighted comparison result provides a correcting factor for the speed reference signal.

54 Claims, 5 Drawing Figures

METHOD AND CIRCUIT FOR THE GENERATION OF A SPEED REFERENCE SIGNAL FOR AN ANTISKID SYSTEM

BACKGROUND OF THE INVENTION

The present invention relates to a method and a circuit for the generation of a speed reference signal adaptable to variations in the motion of a vehicle for use in an antiskid system for fluid-operated vehicular brakes.

Because it is difficult and, for reasons of cost, hardly economically feasible to use a signal required for antiskid systems exactly corresponding to the true vehicle speed as a speed reference signal, the vehicle wheels' instantaneous velocity signals which are available anyway are conventionally used for the derivation of a speed reference signal required to determine the slip of the respective wheels. Depending on the driving condition, this derived speed reference signal may differ substantially from the true vehicle speed.

For the purpose of obtaining a speed reference signal suited for slip control, it is already known to release fully the braking force at one or several vehicle wheels intermittently, so that these wheels are allowed to rotate freely for a short period of time, whereby the instantaneous velocity signal provided by the wheels in this period is a relatively accurate measure of the true vehicle speed, provided that the non-driven wheels are employed. However, in this known method the braking effectiveness obtainable with these wheels is so considerably reduced that the optimum or maximum possible braking values are far from being attained.

The antiskid systems for fluid-operated vehicle brakes, it is also known to initiate a control cycle causing a transient pressure decrease in a vehicle brake either dependent on what is termed a "deceleration criterion", or dependent on what is termed a "slip criterion". In addition to circuit configurations employing either the first or second criterion, an antiskid system is also known from German Patent DE-AS No. 1,937,123, for example, in which both criteria are employed.

In the system of the above-cited German Patent, fixed response thresholds are preset for the "deceleration" or "acceleration" criterion. If these thresholds are passed by a voltage derived from the wheel rotational speed and proportional to the wheel acceleration, a control cycle is initiated or terminated for the wheel concerned. However, in view of the fact that uneven road surfaces or variations in the rolling radius, for example, may cause quite considerable accelerations or decelerations at the individual vehicle wheels, the respective response thresholds must be set at a level sufficiently high to avoid spurious initiation or termination of control cycles.

On the other hand, such high response thresholds increase the danger of wheel lock without deceleration values being thereby attained which cause the initiation of a control cycle. In such a case, the so-called "slip criterion" will take effect in which, as an alternative to the "deceleration criterion", a control cycle will be initiated if the wheel speed drops below the vehicle speed a predetermined amount.

Here, too, the difficulty is to generate a speed reference signal representing the vehicle speed with a sufficient amount of accuracy for comparison with the instantaneous velocity signals of the individual wheel to determine their respective slip.

In the device described in the above-cited German Patent, the instantaneous velocity signal of the fastest rotating vehicle wheel is used as the speed reference signal for slip control. As a result, in cases where a motor vehicle equipped with such an antiskid system is to start on slippery ground, for example on snow, and the driven wheels spin, the instantaneous velocity signal of the highest spinning wheel, which signal is out of all defined proportion to the true vehicle speed, is used as the speed reference signal. Consequently, an unrealistically high slip is simulated for the non-driven wheels and the driven wheel which spins less, which may result in a dangerous release of the braking force at these wheels.

SUMMARY OF THE INVENTION

Based on this state of the art, it is an object of the present invention to improve upon the method described hereinabove so as to obtain a speed reference signal always very well correlated with the actual vehicle speed without the effectiveness of the fluid-operated vehicle brake being impaired.

A feature of the present invention is the provision of a method for generation of a speed reference signal adjustable to variations in the speed of a vehicle for use in an antiskid system for fluid-operated vehicular brakes comprising the steps of comparing an existing speed reference signal cyclically and separately with an instantaneous velocity signal derived for each individual wheel of a vehicle to determine whether the reference signal is greater than, less than or equal to each of the instantaneous velocity signal; weighting each result of the comparing step dependent on whether the instantaneous velocity signal producing the result comes from a driven wheel or a non-driven wheel; producing a correcting signal from the weighted comparison results; and adjusting the reference signal in accordance with the correcting signal.

By the continuous comparison of the stored speed reference signal with weighted instantaneous velocity signals coming from the individual wheels, a very good approximation of the speed reference signal to the true vehicle speed is achieved because the speed reference signal is increased, decreased or maintained unchanged dependent on whether the weighted composite signal is positive or negative or shows no variation relative to the speed reference signal, whereby the weighting permits consideration of the extent to which the individual wheels are to contribute to the correction of the speed reference signal. Thus, it is possible, for example, to reduce the influence of the driven wheels on the speed reference signal to such an amount that these wheels are no longer in a position to increase the speed reference signal in a dangerous way, for example, when wheel spin-up occurs as a result of the vehicle trying to get away on slippery ground. Accordingly, it is no longer necessary to provide a short-time release of brake pressure at individual wheels in order to obtain a good approximation of the speed reference signal to the actual vehicle speed. This, in turn, permits maximum braking efficiency at all times.

The individual weightings may be defined within wide limits and are thus meticulously adaptable to the individual application. Thus, for example, the wheel signals of a motorcycle will be weighted different from those of a passenger car, and in a truck having three axles and eight wheels, for instance, still another weighting will be used.

A particularly advantageous embodiment of the method of the present invention is characterized in that for each vehicle wheel controlled by the antiskid system a speed reference signal of its own is generated, and in that during each weighting operation an evaluation is made increasing the weight of the comparison result related to the associated vehicle wheel.

Providing an individual speed reference signal for each vehicle wheel, during the generation of which the associated vehicle wheel is specially weighted, affords advantages in particular with regard to the initiation of control cycles in antiskid systems.

Thus, for instance, a global speed reference signal used as a common signal for the slip control of all wheels controlled by the antiskid system does not represent an optimum criterion for the initiation of a control cycle under all driving conditions occurring, not even if this reference quantity is successfully approximated to the actual vehicle speed very closely. For example, while the vehicle moves around a turn, the outward wheels rotate a higher speed than the corresponding "actual" vehicle speed, whereas the inward wheels rotate accordingly slower. In order to prevent a spurious control cycle being initiated for the inward wheels, it is necessary to choose the predetermined distance required between the instantaneous velocity signal of a wheel and the speed reference signal for a control cycle to be initiated, suitably large, which, on the other hand, is a disadvantage because it results in a marked reduction in the responsiveness of the slip control for all wheels during straight running and for the outward wheels during cornering.

In contrast, it is achieved by the generation of individual speed reference signals as disclosed in the present invention that the individual speed reference signals are adapted to the individual roll velocities of the associated wheels such that the threshold level, which when passed causes a control cycle to be initiated, can be chosen substantially smaller than before resulting in an increased responsiveness of the slip control.

Preferably, a fixed value is preset for the maximum decreasing speed, corresponding to a deceleration, of the individual speed reference signal, and the occurrence of a predetermined difference between the wheel-related speed reference signal lowered at a maximum modification rate and the instantaneous wheel velocity signal is utilized in particular as a criterion for the initiation of a control cycle of the antiskid system.

The use of the wheel-related speed reference signal to obtain a "deceleration criterion" for the initiation of a control cycle is above all particularly advantageous because, on the one hand, the decision that the deceleration threshold has been passed can be made very quickly, while, on the other hand, the possibility exists to correct this decision should the difference between the decreasing threshold corresponding to the maximum modification rate and the wheel speed not be very large yet. Thereby a kind of filtering effect is accomplished permitting recurring interference peaks to be distinguished from actual locked conditions.

The use of wheel-related speed reference signals thus provides an advantageous possibility to obtain the "deceleration criterion" and the "slip criterion".

Finally, in another advantageous embodiment of the method of this invention, prior to each weighting operation a predetermined offset signal is added to the signal values obtained by the comparison of the individual instantaneous velocity signals not coming from the wheel associated with the speed reference signal.

The use of such offset signals, whose magnitude is predetermined depending on the application involved, makes it possible to choose the influence of the associated wheel, i.e., the wheel for which the special speed reference quantity is formed, on the reference quantity different from the influence of the extraneous wheels.

In this variant of the invention, the generation of the speed reference signal by the extraneous wheels is invariably accomplished in consideration of the effect of the offset signals. These offset signals, which are imprinted on the individual "extraneous" wheels, cause an "artificial" decrease in the instantaneous velocity of the "extraneous" wheels, so that these wheels exert an influence directed towards a decrease in the speed reference signal if, for instance, all vehicle wheels rotate without any application of braking torque, without any slip and at the same speed during straight running. This tendency, however, which is directed towards a decrease in the speed reference signal, is counteracted by the instantaneous velocity signal of its own wheel, which signal is not affected by the offset signal, and by suitably choosing the weighting signals it can be readily achieved that the speed reference signal is maintained constant in spite of the influence of the "extraneous wheels" directed towards a decrease.

In the event of a "creeping" transition of a wheel into a locked condition, the offset signals prevent the relevant speed reference signal from decreasing further after the distance predetermined by the offset signals has been "used up", so that here too, after a certain period of time, a difference between instantaneous velocity signal and speed reference signal is created which is greater than a predetermined threshold level and, consequently, sufficient to initiate a control cycle.

Therefore, the occurrence of offset signals affords a particularly advantageous, simple and reliable possibility to utilize the speed reference signal generated for each wheel individually once for the "deceleration criterion" and once for the "slip criterion".

In a particularly advantageous improvement of the present invention, in the presence of a separate speed reference signal for each wheel not only are the instantaneous velocities of the wheels cyclically compared therewith employing a multiplexer but also the individual instantaneous velocity signals are cyclically compared with the four different speed reference signals by means of another multiplexer. Thus, the comparator receives the signals to be compared from two multiplexers, with the full cycle of the one multiplexer being completed four times during the period of time in which the other multiplexer performs one cycle. Preferably, the faster multiplexer feeds the speed reference signals resulting in a total of sixteen comparison operations during one total comparison phase.

Another feature of the present invention is the provision of a circuit for generation of a speed reference signal adjustable to variation in the speed of a vehicle for use in an antiskid system for fluid-operated vehicular brakes comprising: a storage circuit storing therein a speed reference signal; a comparator coupled to the storage circuit to compare the reference signal with n instantaneous velocity signals each obtained from a different one of n vehicle wheels; a weighting circuit coupled to the comparator to weight each output signal of the comparator dependent upon whether the output signal of the comparator is derived from an instantaneous velocity signal generated by a driven wheel or a non-driven wheel; and a correcting circuit coupled to the weighting circuit and the storage circuit to form a correcting signal in response to the weighted output signals of the weighting circuit, the correcting signal being coupled to the storage circuit to adjust the reference signal stored therein.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

The Figures explained in the following in detail do not specifically relate to one of the various known signal-processing possibilities. In particular the fact that connections between individual blocks are shown by one line only does not necessarily mean that only one single line is involved. Thus, connections which in serial data transmission systems can be realized by one single connecting line can be replaced by a suitable number of individual lines where parallel data transmission systems are desired. The practical design of the circuitry details results from the chosen type of signal transmission and the operation and interaction of the individual circuit blocks described in the following and can be readily determined by those skilled in the art depending on the requirements.

Figure 1:
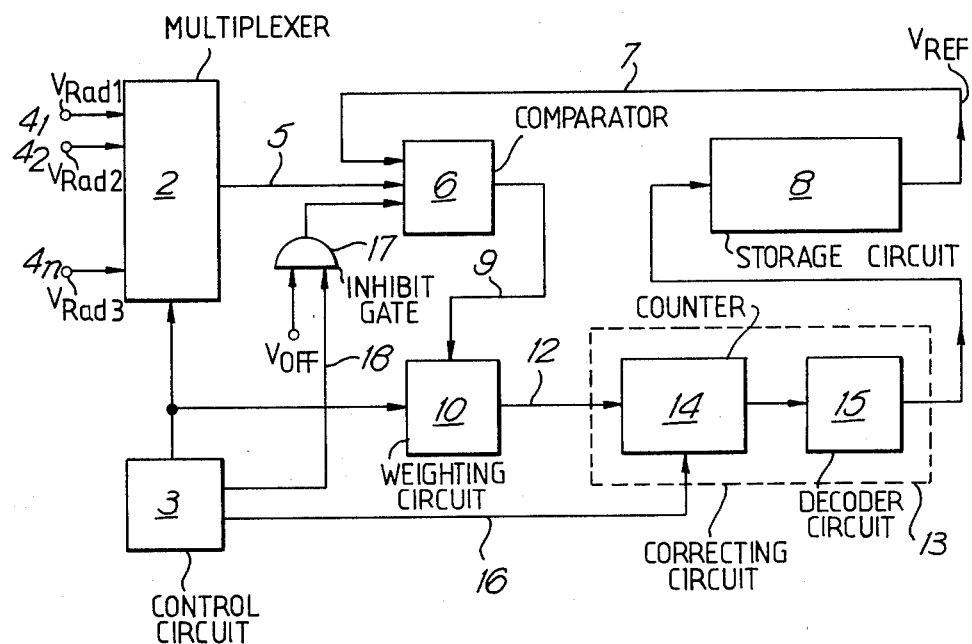
FIG. 1 is a general block diagram illustrating a circuit for implementing the method in accordance with the principles of the present invention.

In the embodiment shown in FIG. 1, the instantaneous velocity signals $V_{Rad\ 1}$ to $V_{Rad\ n}$ are present on input terminals $4_1$, $4_2$ to $4_n$ of a multiplexer 2 which is driven by a control circuit 3 such that these signals are applied in the time-sharing mode, i.e., in succession and cyclically, to an input line 5 of a comparator 6.

Via a second input line 7, comparator 6 receives the speed reference signal $V_{Ref}$ held in a storage circuit 8 to compare it with the instantaneous velocity signals $V_{Rad\ 1}$ to $V_{Rad\ n}$.

In the event of the generation of wheel-related reference signals, comparator 6 receives via another input line an offset signal $V_{Off}$ from a gate circuit 17 which, whenever comparator 6 has applied to it via input line 5 the instantaneous velocity signal $V_{Rad}$ coming from the associated wheel, is driven by control circuit 3 of multiplexer 2 via line 18 such that it suppresses the offset signal at the third input of comparator 6.

Figure 2:
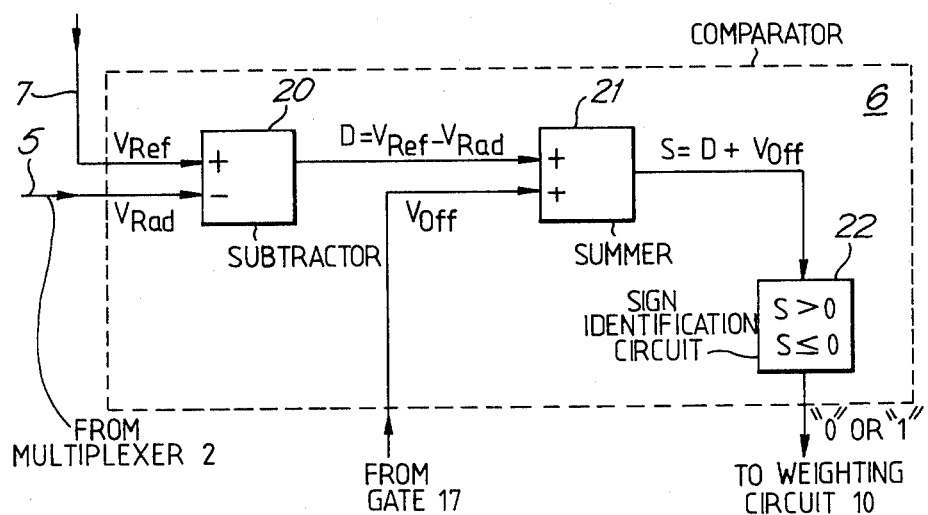
FIG. 2 is a detailed block diagram of comparator 6 of FIG. 1.

As can best be seen in FIG. 2, comparator 6 comprises a subtractor stage 20 having its positive input connected to the information output of storage circuit 8 via line 7, thus receiving the speed reference signal $V_{Ref}$, while the negative input of subtractor stage 20 receives the instantaneous velocity signals $V_{Rad\ 1}$ to $V_{Rad\ n}$ from multiplexer 2 via input line 5.

At the output of subtractor stage 20, there appears the difference signal D of the input signals of subtractor stage 20 to which difference signal the offset signal $V_{Off}$ coming from gate 17 is added in the succeeding summer stage 21.

Then the composite signal S appearing at the output of summer stage 21 is supplied to a sign identification circuit 22 issuing two distinct output signals, for instance, a logic "0" level and a logic "1" level, dependent on whether the composite signal applied to it is positive or zero or negative.

The output signals of sign identification circuit 22 which are at the same time the output signals of comparator 6 are supplied to a weighting circuit 10 via a line 9.

The construction of multiplexer 2, control circuit 3 and weighting circuit 10 will now be explained in more detail with reference to FIG. 3 for a four-wheeled motor vehicle.

Multiplexer 2 comprises four AND gates 25 to 28 whose outputs are combined in an OR gate 29 and connected to input line 5 of comparator 6. Each of the AND gates 25 to 28 of multiplexer 2 has a second input via which they are driven in succession and cyclically by a control circuit 3 comprising substantially a counter 32 counting periodically up to four and a 1-out-of-4 decoder 31 decoding the count of counter 32, such that the instantaneous velocity signals $V_{Rad\ 1}$ to $V_{Rad\ 4}$ present on input terminals $4_1$ to $4_4$ appear one after the other on input line 5 of comparator 6.

Figure 3:
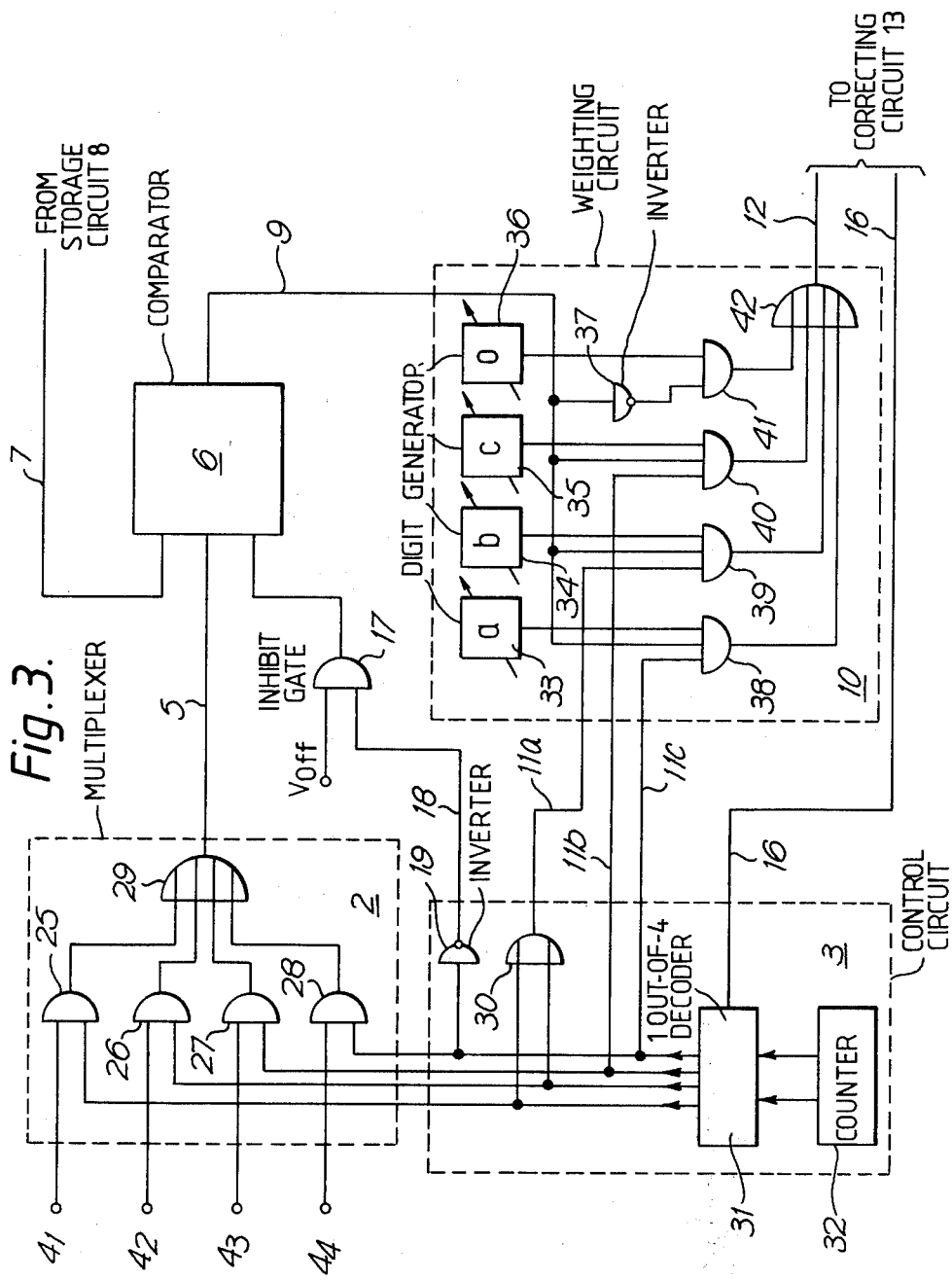
FIG. 3 is a detailed block diagram of multiplexer 2, control circuit 3 and weighting circuit 10 of FIG. 1 dealing with the special case of generation of a wheel-related reference signal.

In the embodiment of FIG. 3, it is further assumed that input line $4_4$ has applied to it the instantaneous velocity signal of a driven wheel associated with this circuit. Accordingly, by means of the drive signal of decoder 31 appearing at the second input of AND gate 28 and inverted in inverter 19, an inhibit signal is supplied to INHIBIT gate 17 via line 18, so that the offset signal $V_{Off}$ present on the second input of INHIBIT gate 17 does not appear at the second input of summer stage 21 of comparator 6 (FIG. 2) when the instantaneous velocity signal of the associated wheel is compared with the speed reference signal.

In the embodiment of FIG. 3, it is still further assumed that the instantaneous velocity signals of the non-driven wheels are available on input lines $4_1$ and $4_2$. The drive signals supplied by decoder 31 to the second inputs of associated gates 25 and 26 are combined in an OR gate 30 and supplied to weighting circuit 10 via a line 11a. Via line 11b, weighting circuit 10 receives the drive signal generated by decoder 31 for gate 27 of multiplexer 2 which has applied to its first input $4_3$ the instantaneous velocity signal of the second driven wheel.

Via line 11c, finally, weighting circuit 10 receives the drive signal for gate 28 from decoder 31.

In FIG. 3, weighting circuit 10 comprises four digit generators 33 to 36 for producing constant adjustable values a, b, c and O, which have connected to their outputs AND gates 38 to 41, respectively. In the example chosen, the relationship of the constant values is: a is greater than b, b is greater than c. The outputs of the AND gates are combined in an OR gate 42 driving the output line 12 (FIG. 1) of weighting circuit 10 which leads to a correcting circuit 13.

AND gate 38 which is connected to digit generator 33 for producing weight signal a possesses two further inputs one of which is connected to output line 9 of comparator 6, while the other is connected to output line 11c of control circuit 3. Thus, the digit value a will be present on the output of AND gate 38 and, consequently, also on output line 12 of weighting circuit 10 whenever the instantaneous velocity signal of the associated wheel is present on input 5 of comparator 6, which is defined by a logic "1" level on line 11c, and also whenever sign identification circuit 22 of comparator 6 establishes that composite signal S of summer stage 21 ($V_{Off}$ being equal to zero in the associated wheel), which in this case is identical with difference signal D, is smaller than or equal to zero, this condition being defined by a logic "1" level on output line 9 of comparator 6 and signifying that the speed reference signal $V_{Ref}$ is equal to or less than the instantaneous velocity signal $V_{Rad}$ of the associated wheel. Thus, a piece of information is generated here which is aimed at keeping the speed reference signal $V_{Ref}$ constant or at increasing it. Since this information comes from the driven associated wheel, the information is assigned such a high weight signal that an increase in the speed reference signal $V_{Ref}$ will result in any case, as will be shown in more detail in the following.

The second input of AND gate 39 connected to digit generator 34 for producing weight signal b is connected via line 11a to OR gate 30 of control circuit 3 and is thus always driven by a logic "1" level when the instantaneous velocity signal of a non-driven wheel appears on input line 5 of comparator 6. If sign identification circuit 22 of comparator 6 then establishes that the composite signal S at the output of summer circuit 21, i.e., the difference signal D between speed reference signal $V_{Ref}$ and the relevant instantaneous velocity signal $V_{Rad}$ which difference signal is increased by offset voltage $V_{Off}$, is less than or equal to zero, a logic "1" level will also appear on line 9 leading from comparator 6 to weighting circuit 10 and connected to the third input of AND gate 39, whereby digit value b is applied to output line 12 of weighting circuit 10.

If this occurs twice within a multiplex cycle, i.e., for both non-driven wheels, an increase in the speed reference signal $V_{Ref}$ will also result, as will be shown hereinafter.

In a manner corresponding to what has been described with reference to gates 38 and 39, digit value c will always be present on the output of AND gate 40 connected to digit generator 35 for producing digit value c, and thus on output 12 of weighting circuit 10, whenever the instantaneous velocity signal of the second driven wheel is present on input 5 of comparator 6 and it is determined that the associated composite signal S is equal to, or greater than, zero.

AND gate 41 connected to digit generator 36 for producing weight signal O will transfer this weight signal, via OR gate 42 and line 12, to correcting circuit 13 whenever the composite signal of summer circuit 21 is equal to, or less than, zero, as a result of which the sign identification circuit 22 of comparator 6 will issue a logic "0" level converted in inverter 37 into a corresponding drive signal for AND gate 41. Because this weight signal is generated independent of which wheel provides the associated instantaneous velocity signal $V_{Rad}$, AND gate 41 has no input which is connected to control circuit 3.

It will be apparent that circuits 36, 37 and 41 are shown in FIG. 3 for systematic purposes only because the logic "0" level thereby obtained can also be generated in another simpler manner. Accordingly, these circuits may also be omitted.

Figure 4:
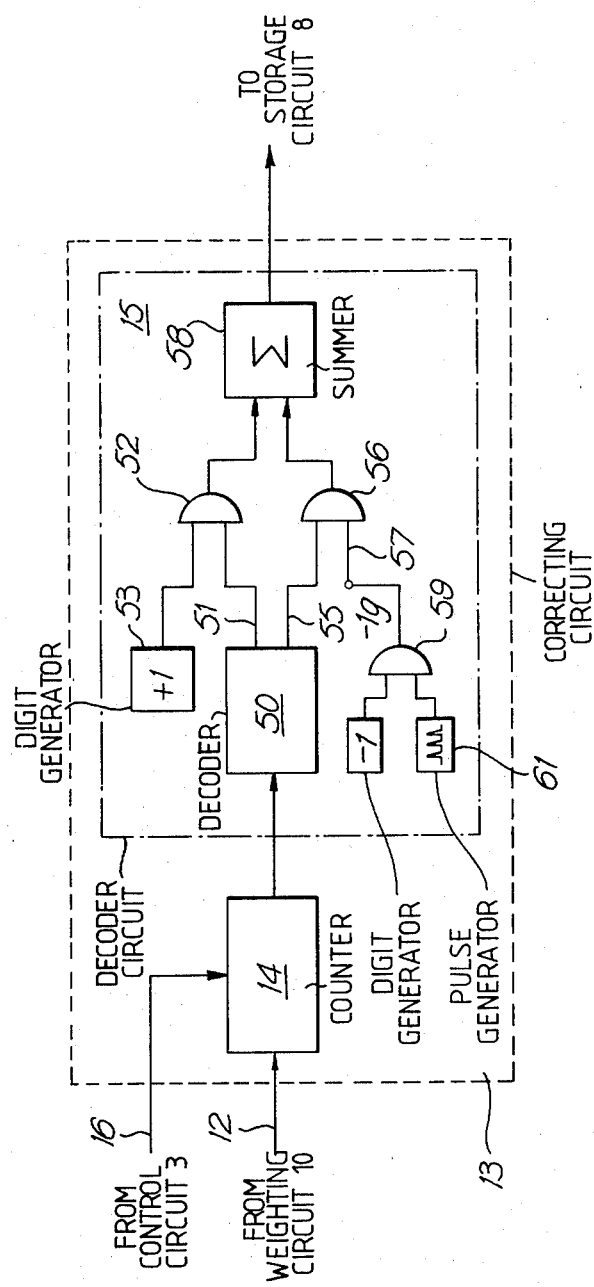
FIG. 4 is a detailed block diagram of correcting circuit 13 of FIG. 1.

Correcting circuit 13 shown in the block diagram of FIG. 1 and in more detail in FIG. 4, which is driven by weighting circuit 10 via line 12, comprises a counter 14 which adds the weight signals supplied by weighting circuit 10 during a multiplex cycle and is resettable to zero via line 16 from control circuit 3 at the end of each multiplex cycle. The counting result determined by counter 14 during a multiplex cycle is supplied to a decoder circuit 15 comprising a threshold level decoder 50 generating on its output lines 51 and 55 a logic "1" level if the counting result in counter 14 at the end of the multiplex cycle reads:

Count is greater than or equal to a, or
count is less than or equal to b.

In the first case, the logic "1" level appearing on line 51 will open AND gate 52 which receives on its second input a digit value of, say, +1 supplied by a digit generator 53, passing it on to the modification input of storage circuit 8 via summer 58. It will be apparent that the associated wheel alone is in a position to increase the speed reference signal, because in the event of the speed reference signal $V_{Ref}$ dropping below the relevant instantaneous velocity signal $V_{Rad}$, the difference signal D supplied by subtractor circuit 20 of comparator 6 is negative. The same applies to composite signal S supplied by summer circuit 21 of comparator 6, because offset signal $V_{Off}$ is equal to zero for the associated wheel. Thus, sign identification circuit 22 of comparator 6 will deliver a logic "1" level which, in combination with the logic "1" level supplied by control circuit 3 via line 11c, causes opening of gate 38 of weighting circuit 10, as a result of which weight signal a is delivered to counter 14 of correcting circuit 13. Thus, a count is obtained which is in any case sufficient to cause, at the end of the multiplex cycle, correcting circuit 13 to supply a control signal resulting in an increase in the contents of storage circuit 8, i.e., in the speed reference signal $V_{Ref}$.

In the second case, i.e., with the count of counter 14 being less than or equal to b, a logic "1" level will be present on output line 55 of decoder 50 which opens AND gate 56. Present on the second input 57 of this AND gate are (−1) signals which are gated with a pulse generator 61 via an AND gate 59 at such time intervals that a pulse repetition rate corresponding to a predetermined fixed deceleration results, i.e., the speed reference signal $V_{Ref}$ is correspondingly reduced.

Figure 5:
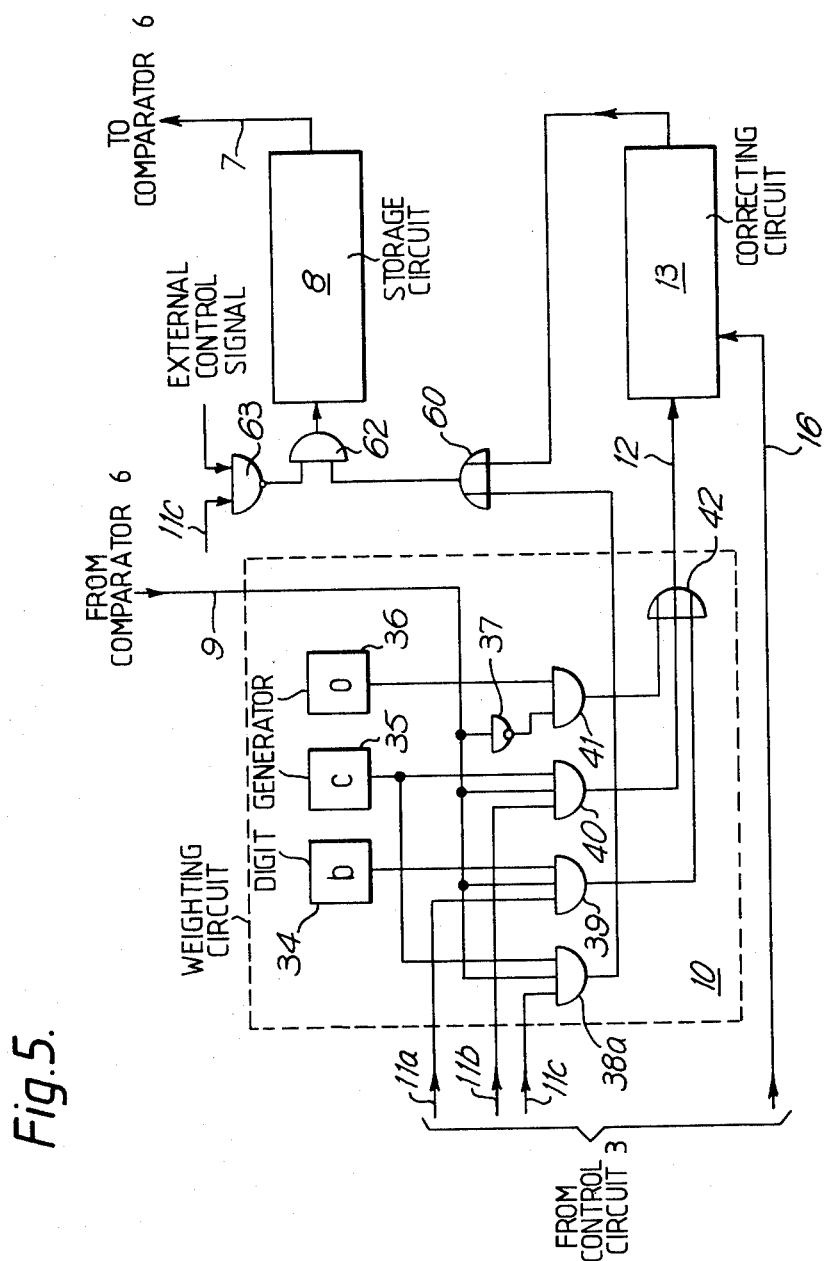
FIG. 5 is a detailed block diagram of weighting circuit 10 illustrating another embodiment thereof.

FIG. 5 shows a somewhat different embodiment of weighting circuit 10, the difference from the circuit of FIG. 3 being in particular that it contains no digit generator for producing value a. Instead, an AND gate 38a is connected to digit generator 35 for producing weight signal c, which, as gate 38 in the embodiment of FIG. 3, is driven by line 11c coming from control circuit 3 and by line 9 carrying the output signals of comparator 6.

In this embodiment, in cases where the instantaneous velocity signal stemming from the associated wheel is greater than or equal to the speed reference signal, not digit value a, but digit value c will be generated by weighting circuit 10 at the output of gate 38a, with digit value c being directly supplied to the correcting input of storage circuit 8 via an OR gate 60, thereby by-passing correcting circuit 13, so that in this embodiment too, the speed reference signal $V_{Ref}$ is increased solely under the influence of the associated wheel. The output signal of correcting circuit 13 is present on the second input of OR gate 60, with circuit 13 having the same configuration as described with reference to FIG. 4.

The signal coming from OR gate 60 and destined for storage circuit 8 is passed through an AND gate 62 which is shiftable between a conductive and a non-conductive state by a drive signal corresponding to the clock processing time of the associated wheel.

AND gate 62 is driven by a NAND gate 63 which corresponds to an AND gate with a succeeding inverter and is driven, on the one hand, when a logic "1" level is present on line 11c, i.e., when the associated wheel is scanned by the multiplexer, and, on the other hand, when an external control signal is applied. This external control signal may be determined by criteria resulting from the presence of a control cycle. This does not, however, represent a restricting condition for this external control signal.

In the description of the foregoing embodiments in connection with the generation of four speed reference signals, only the generation of one speed reference signal has been explained by way of example, because the other speed reference signals are generated analogously, the assignment of the respective associated wheel, however, having to be suitably considered in the individual drive operations.

In the embodiments of the circuit of the invention hereinabove described, it has always been understood that storage circuit 8 stores only one speed reference signal which is adaptable to the varying driving conditions of the vehicle by means of the other circuit elements. However, the invention also provides the possibility for storage circuit 8 to have two or more locations to accommodate two or more speed reference signals. For adjustment of these speed reference signals, the same comparator 6, the same weighting circuit 10 and the same correcting circuit 13 may in principle be used. The most substantial change for such a circuit configuration is the necessity for the multiplexer and its control circuit to be constructed such that the individual instantaneous velocity signals are compared with each of the "old" speed reference signals, with particular care being required to ensure suppression of the offset signal in the individual speed reference signals in the individual associated wheel. Also it is to be understood that in counter 14 of correcting circuit 13 the individual correcting signals must be processed separately which may be accomplished either by parallel processing or by time-sharing.

While we have described above the principles of our invention in connection with specific apparatus it is to be clearly understood that this description is made only by way of example and not as a limitation to the scope of our invention as set forth in the objects thereof and the accompanying claims.

We claim:

1. A method for generation of a speed reference signal adjustable to variations in the speed of a vehicle for use in a antiskid system for fluid-operated vehicular brakes comprising the steps of
   comparing an existing speed reference signal cyclically and separately with an instantaneous velocity signal derived for each individual wheel of a vehicle to determine whether said reference signal is greater than, less than or equal to each of said instantaneous velocity signal;
   weighting each result of said comparing step dependent on whether said instantaneous velocity signal producing said result comes from a driven wheel or a non-driven wheel;
   producing a correcting signal from said weighted comparison results; and
   adjusting said reference signal in accordance with said correcting signal.

2. A method according to claim 1, wherein
   an adjusted speed reference signal is provided for each vehicle wheel controlled by said antiskid system, and
   said weighting step further includes the step of
      performing an evaluation that increases the weight of said result related to an associated one of said vehicle wheels.

3. A method according to claim 2, wherein
   said step of comparing further includes
      providing a preset fixed value for a maximum decreasing speed corresponding to a deceleration of each of said reference signals.

4. A method according to claim 2, wherein
   said step of comparing includes
      comparing each of said instantaneous velocity signals with an associated one of said speed reference signals.

5. A method according to claim 2, further including the step of
   adding a predetermined offset signal to those of said comparison results derived from a vehicle wheel not controlled by said antiskid systems.

6. A circuit for generation of a speed reference signal adjustable to variation in the speed of a vehicle for use in an antiskid system for fluid-operated vehicular brakes comprising:
   a storage circuit storing therein a speed reference signal;
   a comparator coupled to said storage circuit to compare said reference signal with n instantaneous velocity signals each obtained from a different one of n vehicle wheels;
   a weighting circuit coupled to said comparator to weight each output signal of said comparator dependent upon whether said output signal of said comparator is derived from an instantaneous velocity signal generated by a driven wheel or a non-driven wheel; and
   a correcting circuit coupled to said weighting circuit and said storage circuit to form a correcting signal in response to said weighted output signals of said weighting circuit, said correcting signal being coupled to said storage circuit to adjust said reference signal stored therein.

7. A circuit according to claim 6, wherein
   each vehicle wheel controlled by said antiskid system has a storage circuit associated therewith storing its speed reference signal, and
   said weighting circuit weights each output signal of said comparator with an additional distinct weight dependent on whether said instantaneous velocity signal used for providing a particular one of said output signals of said comparator stems from an associated one of said vehicle wheel or another vehicle wheel not controlled by said antiskid system.

8. A circuit according to claim 7, further including
   a summing circuit to add an offset signal to each output of said comparator when said output of said comparator is derived from an instantaneous velocity signal of a vehicle wheel not controlled by said antiskid system.

9. A circuit according to claim 8, wherein said comparator includes
a subtractor to subtract each of said instantaneous velocity signals from its associated one of said reference signals to provide a difference signal and
said summing circuit coupled to said subtractor circuit to provide a composite signal including said difference signal and said offset signal.

10. A circuit according to claims 8 or 9, further including a circuit to couple said offset signal to said summing circuit, said circuit inhibiting coupling said offset signal to said summing circuit when said difference signal stems from one of said vehicle wheels controlled by said antiskid systems.

11. A circuit according to claim 10, wherein said offset signal has a value which is variable in response to vehicle speed.

12. A circuit according to claim 9, wherein said comparator further includes
a sign identification circuit coupled between said summing circuit and said weighting circuit.

13. A circuit according to claims 6, 9 or 12, further including
a multiplexer to cyclically couple each of said instantaneous velocity signals to said comparator.

14. A circuit according to claim 13, wherein said weighting circuit includes
a plurality of adjustable digit generators each producing different weight outputs.

15. A circuit according to claim 14, further including a control circuit coupled to said multiplexer producing cyclic drive signals therefore to couple each of said instantaneous velocity signals cyclically to said comparator, and
wherein said weighting circuit further includes
a plurality of AND gates each coupled to a different one of said pluralities of digit generators, the output of said comparator and different ones of said drive signals.

16. A circuit according to claim 14, further including a control circuit coupled to said multiplexer producing cyclic drive signals therefore to couple each of said instantaneous velocity signals cyclically to said comparator, and
wherein said weighting circuit further includes
a plurality of AND gates each coupled to a different one of said plurality of digit generators, the output of said comparator and certain ones of said drive signals, and
an additional AND gate coupled to a selected one of said digit generators, the output of said comparator and at least one other of said drive signals,
the output of each of said plurality of AND gates being coupled to said correcting circuit, the output of said correcting circuit being coupled to a correcting input of said storage circuit through an OR gate,
the output of said additional AND gate being coupled directly to said correcting input through said OR gate.

17. A circuit according to claim 14, wherein said correcting circuit includes
a counter coupled to said weighting circuit resettable at the end of each cycle of said multiplexer to add each of said weighted output signals of said weighting circuit during each cycle of said multiplexer.

18. A circuit according to claim 17, wherein said correcting circuit further includes
a decoder coupled to the output of said counter, said decoder at the end of each cycle of said multiplex, generating a first control signal causing an increase in said reference signal stored in said storage circuit when said counter reaches a count above a first predetermined numerical value, a second control signal causing a decrease in said reference signal stored in said storage circuit when said counter reaches a count below a second predetermined numerical value, and no control signal thereby leaving said reference signal stored in said storage circuit unchanged when said counter reaches a count that is less than or equal to said first predetermined value and greater than or equal to said second predetermined value.

19. A circuit according to claim 18, wherein said correcting circuit further includes
a first AND gate having a first input coupled to said decoder receiving said first control signal and a second input coupled to a first digit generator producing a digit value of +1,
a second AND gate having a first input coupled to said decoder receiving said second control signal and a second input coupled to a second digit generator producing −1 signals succeeding each other at time intervals corresponding to a fixed deceleration, and
a combining circuit coupled to the outputs of each of said first and second AND gates and to a correcting input of said storage circuit.

20. A circuit according to claim 19, wherein said combining circuit is a summer when said first and second control signals are time coincident.

21. A circuit according to claim 19, wherein said combining circuit is an OR gate when said first and second control signals are not time coincident.

22. A circuit according to claim 19, further including means coupled to said storage circuit to inhibit said correcting signal in response to further logic signals.

23. A circuit according to claim 22, wherein said means includes
a third AND gate coupling said correction signal to said storage circuit shiftable between a conductive state and a non-conductive state by a drive signal corresponding to a clock processing time of an associated one of said vehicle wheels.

24. A circuit according to claim 23, further including a NAND gate having said further logic signals coupled thereto coupled to said third AND gate to supply said drive signal thereto.

25. A circuit according to claims 6 or 9, wherein said weighting circuit includes
a plurality of adjustable digit generators each producing different weight outputs.

26. A circuit according to claim 25, further including a control circuit coupled to said multiplexer producing cyclic drive signals therefore to couple each of said instantaneous velocity signals cyclically to said comparator, and wherein
said weighting circuit further includes
a plurality of AND gates each coupled to a different one of said pluralities of digit generators, the output of said comparator and different ones of said drive signals.

27. A circuit according to claim 25, further including
a control circuit coupled to said multiplexer producing cyclic drive signals therefore to couple each of said instantaneous velocity signals cyclically to said comparator, and
wherein
said weighting circuit further includes
a plurality of AND gates each coupled to a different one of said plurality of digit generators, the output of said comparator and certain ones of said drive signals, and
an additional AND gate coupled to a selected one of said digit generators, the output of said comparator and at least one other of said drive signals,
the output of each of said plurality of AND gates being coupled to said correcting circuit, the output of said correcting circuit being coupled to a correcting input of said storage circuits through an OR gate,
the output of said additional AND gate being coupled directly to said correcting input through said OR gate.

28. A circuit according to claim 25, wherein
said correcting circuit includes
a counter coupled to said weighting circuit resettable at the end of each cycle of said multiplexer to add each of said weighted output signals of said weighting circuit during each cycle of said multiplexer.

29. A circuit according to claim 28, wherein
said correcting circuit further includes
a decoder coupled to the output of said counter, said decoder at the end of each cycle of said multiplexer generating a first control signal causing an increase in said reference signal stored in said storage circuit when said counter reaches a count above a first predetermined numerical value, a second control signal causing a decrease in said reference signal stored in said storage circuit when said counter reaches a count below a second predetermined numerical value, and no control signal thereby leaving said reference signal stored in said storage circuit unchanged when said counter reaches a count that is less than or equal to said first predetermined value and greater than or equal to said second predetermined value.

30. A circuit according to claim 29, wherein
said correcting circuit further includes
a first AND gate having a first input coupled to said decoder receiving said first control signal and a second input coupled to a first digit generator producing a digit value of +1,
a second AND gate having a first input coupled to said decoder receiving said second control signal and a second input coupled to a second digit generator producing −1 signals succeeding each other at time intervals corresponding to a fixed deceleration, and
a combining circuit coupled to the outputs of each of said first and second AND gates and to a correcting input of said storage circuit.

31. A circuit according to claim 30, wherein
said combining circuit is a summer when said first and second control signals are time coincident.

32. A circuit according to claim 30, wherein
said combining circuit is an OR gate when said first and second control signals are not time coincident.

33. A circuit according to claim 30, further including
means coupled to said storage circuit to inhibit said correcting signal in response to further logic signals.

34. A circuit according to claim 33, wherein
said means include
a third AND gate coupling said correction signal to said storage circuit shiftable between a conductive state and a non-conductive state by a drive signal corresponding to a clock processing time of an associated one of said vehicle wheels.

35. A circuit according to claim 34, further including
a NAND gate having said further logic signals coupled thereto coupled to said third AND gate to supply said drive signal thereto.

36. A circuit according to claim 13, wherein
said correcting circuit includes
a counter coupled to said weighting circuit resettable at the end of each cycle of said multiplexer to add each of said weighted output signals of said weighting circuit during each cycle of said multiplexer.

37. A circuit according to claim 36, wherein
said correcting circuit further includes
a decoder coupled to the output of said counter, said decoder at the end of each cycle of said multiplexer, generating a first control signal causing an increase in said reference signal stored in said storage circuit when said counter reaches a count above a first predetermined numerical value, a second control signal causing a decrease in said reference signal stored in said storage circuit when said counter reaches a count below a second predetermined numerical value, and no control signal thereby leaving said reference signal stored in said storage circuit unchanged when said counter reaches a count that is less than or equal to said first predetermined value and greater than or equal to said second predetermined value.

38. A circuit according to claim 37, wherein
said correcting circuit further includes
a first AND gate having a first input coupled to said decoder receiving said first control signal and a second input coupled to a first digit generator producing a digit value of +1,
a second AND gate having a first input coupled to said decoder receiving said second control signal and a second input coupled to a second digit generator producing −1 signals succeeding each other at time intervals corresponding to a fixed deceleration, and
a combining circuit coupled to the outputs of each of said first and second AND gates and to a correcting input of said storage circuit.

39. A circuit according to claim 38, wherein
said combining circuit is a summer when said first and second control signals are time coincident.

40. A circuit according to claim 38, wherein said combining circuit is an OR gate when said first and second control signals are not time coincident.

41. A circuit according to claim 38, further including means coupled to said storage circuit to inhibit said correcting signal in response to further logic signals.

42. A circuit according to claim 41, wherein said means includes
a third AND gate coupling said correction signal to said storage circuit shiftable between a conductive state and a non-conductive state by a drive signal corresponding to a clock processing time of an associated one of said vehicle wheels.

43. A circuit according to claim 42, further including a NAND gate having said further logic signals coupled thereto coupled to said third AND gate to supply said drive signal thereto.

44. A circuit according to claim 13, further including means coupled to said storage circuit to inhibit said correcting signal in response to further logic signals.

45. A circuit according to claim 44, wherein said means includes
a AND gate coupling said correction signal to said storage circuit shiftable between a conductive state and a non-conductive state by a drive signal corresponding to a clock processing time of an associated one of said vehicle wheels.

46. A circuit according to claim 45, further including a NAND gate having said further logic signals coupled thereto coupled to said AND gate to supply said drive signal thereto.

47. A circuit according to claims 6 or 9, further including
means coupled to said storage circuit to inhibit said correcting signal in response to further logic signals.

48. A circuit according to claim 47, wherein said means includes
a AND gate coupling said correction signal to said storage circuit shiftable between a conductive state and a non-conductive state by a drive signal corresponding to a clock processing time of an associated one of said vehicle wheels.

49. A circuit according to claim 48, wherein a NAND gate having said further logic signals coupled thereto coupled to said AND gate to supply said drive signal thereto.

50. A circuit according to claims 6 or 9, wherein said correcting circuit includes
a counter coupled to said weighting circuit resettable at the end of each comparing cycle to add each of said weighted output signals of said weighting circuit during each of said cycles.

51. A circuit according to claim 50, wherein said correcting circuit further includes
a decoder coupled to the output of said counter, said decoder, at the end of each cycle, generating a first control signal causing an increase in said reference signal stored in said storage circuit when said counter reaches a count above a first predetermined numerical value, a second control signal causing a decrease in said reference signal stored in said storage circuit when said counter reaches a count below a second predetermined numerical value, and no control signal thereby leaving said reference signal stored in said storage circuit unchanged when said counter reaches a count that is less than or equal to said first predetermined value and greater than or equal to said second predetermined value.

52. A circuit according to claim 51, wherein said correcting circuit further includes
a first AND gate having a first input coupled to said decoder receiving said first control signal and a second input coupled to a first digit generator producing a digit value of $+1$,
a second AND gate having a first input coupled to said decoder receiving said second control signal and a second input coupled to a second digit generator producing $-1$ signals succeeding each other at time intervals corresponding to a fixed deceleration, and
a combining circuit coupled to the outputs of each of said first and second AND gates and to a correcting input of said storage circuit.

53. A circuit according to claim 52, wherein said combining circuit is a summer when said first and second control signals are time coincident.

54. A circuit according to claim 52, wherein said combining circuit is an OR gate when said first and second control signals are not time coincident.

* * * * *